2 Sheets—Sheet 1.

J. M. READ.
Cooking-Stove.

No. 8,810. Reissued July 15, 1879.

WITNESSES.
Geo. F. Walker
A. J. Oettinger

INVENTOR.
Josiah M. Read
by his attys
Clarke & Raymond

M. PETERS, PHOTO-LITHOGRAPHER, WASHINGTON, D. C.

J. M. READ.
Cooking-Stove.
No. 8,810. Reissued July 15, 1879.
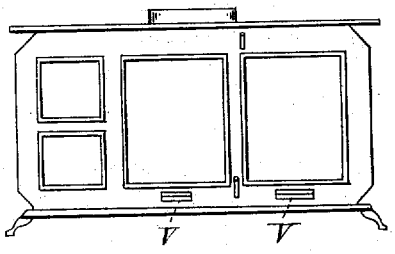
Fig. 3.
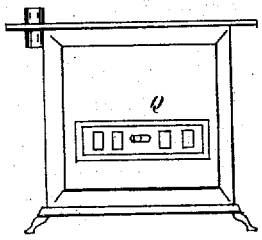
Fig. 4.
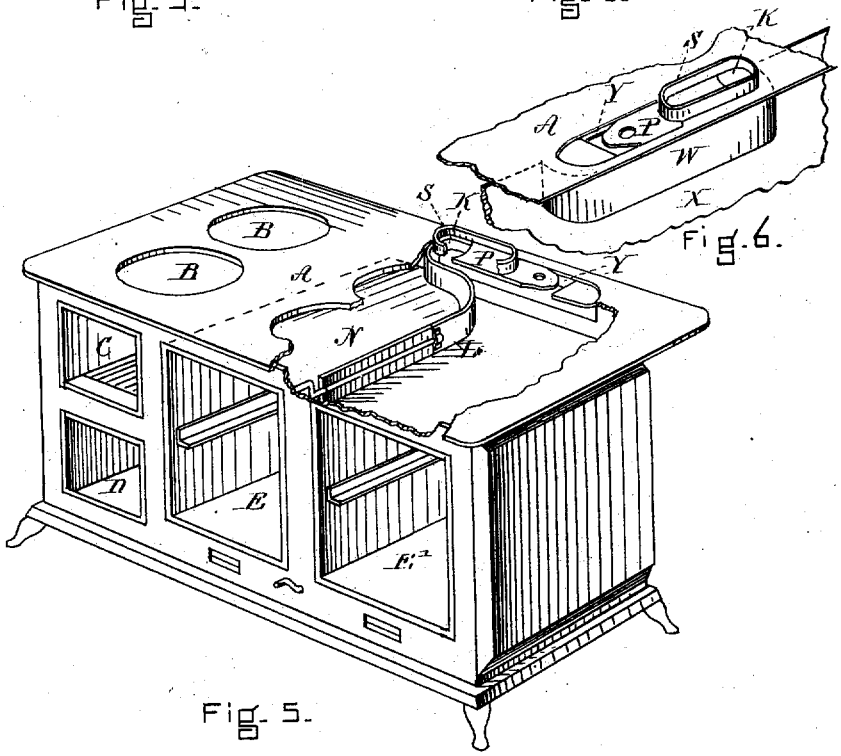
Fig. 6.
Fig. 5.
WITNESSES.
Geo. F. Walker
A. J. Oettinger.
INVENTOR.
Jonathan M. Read
by his Attys.
Charles H. Raymond
W. PETERS, PHOTO-LITHOGRAPHER, WASHINGTON, D. C.

UNITED STATES PATENT OFFICE.

JOSIAH M. READ, OF BOSTON, MASSACHUSETTS.

IMPROVEMENT IN COOKING-STOVES.

Specification forming part of Letters Patent No. 103,655, dated May 31, 1870; Reissue No. 8,810, dated July 15, 1879; application filed June 7, 1879.

*To all whom it may concern:*

Be it known that I, JOSIAH M. READ, of Boston, in the county of Suffolk, in the Commonwealth of Massachusetts, have invented certain new and useful Improvements in Cooking Stoves and Ranges; and I hereby declare the following to be a full and exact description thereof, reference being had to the accompanying drawings, forming a part of this specification.

The nature of my invention consists in a peculiar arrangement of the flues of a double-oven stove or range, together with a deflecting-plate to carry the draft more directly beneath the boiler-holes or boilers, and in a peculiar arrangement of the damper for regulating the draft, as will be more fully set forth below.

Figure 2:
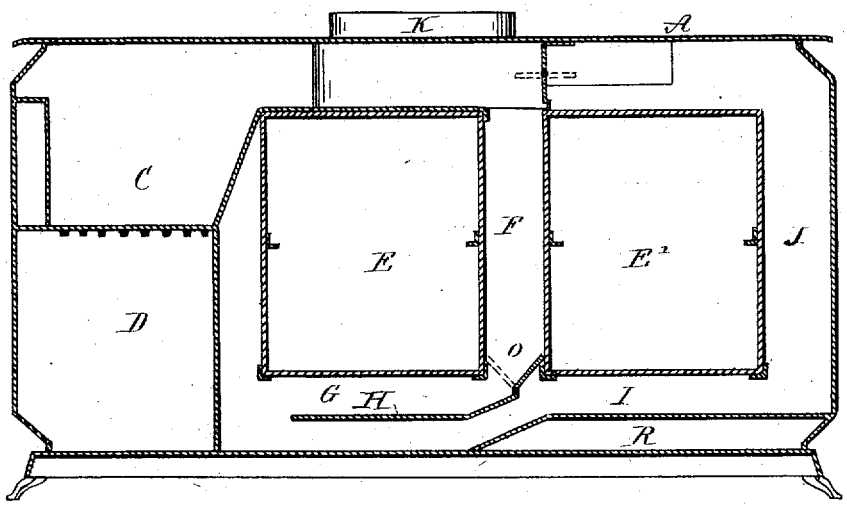
Figure 1:
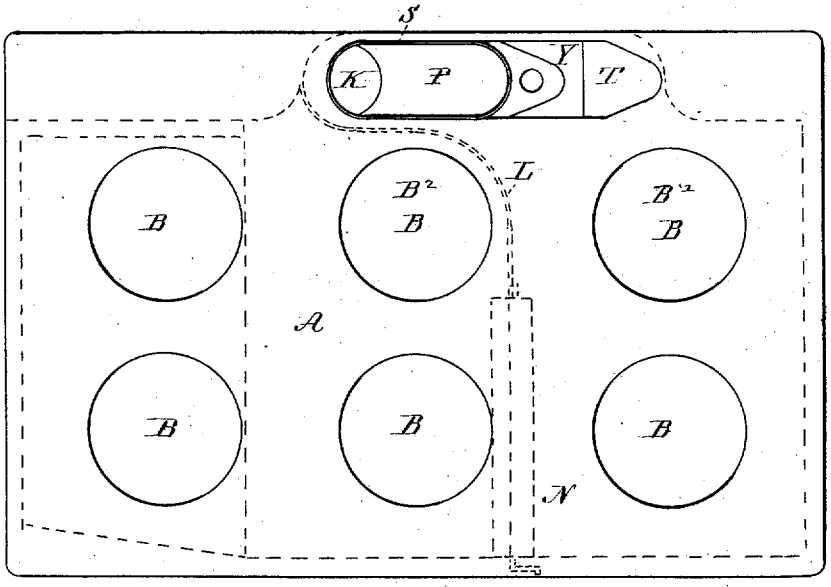

In the drawings, Figure 1 is a top view of a stove or range; Fig. 2, a vertical section of the same; Fig. 3, an elevation of the front on a reduced scale; Fig. 4, a view of the end containing the fire-box; Fig. 5, a perspective of the stove with a portion of the top plate broken away to expose the deflecting-plate, the damper, and flue-box. Fig. 6 is an enlarged perspective of the flue-box, collar, damper, &c.

The top plate A is provided with the usual boiler-holes B. C is a fire-box, and D an ash box or pit beneath it.

E and E′ are two ovens, side by side, and the flame and the draft-current from the fire-box C passes first over the oven E; then down through the flue F, between the two ovens; then turns beneath the oven E by the flue G; then, passing beneath the dividing-plate H, it goes by the flue I under the oven E′; then up the flue J and over the top of oven E′ through the flue-box to the escape-port or smoke-pipe opening, at K.

The left side of the oven E being adjacent to the fire-box receives sufficient heat therefrom, and the whole draft-current from the fire passes undivided through the flues and passages above named, around both ovens, so that every side is heated.

The deflecting-plate L, (shown in dotted lines in Fig. 1,) together with the valve or damper N, prevents the draft from passing directly to the smoke-pipe, compelling it to pass down between the ovens; but in kindling or quickening the fire, or when the ovens are not in use, the valve N may be opened, and in that case the heat is directed by the deflecting-plate so as to pass beneath all the boilers or boiler-holes.

Again, if it be desirable to increase the heat of the oven E′, which is farther from the fire, by turning the valve O to the position indicated by dotted lines in Fig. 2, the draft may be carried around that oven without passing under the oven E and the plate H.

The damper P is arranged to slide back and forth directly beneath the collar S, which receives the smoke-pipe, the recess T being provided for it in the top plate A, so that it lies flush, or substantially on the same plane with the surface of the plate.

The flue-box W is cast with the back plate X, or may be independently formed and then attached thereto, and it opens into the flue over the oven E′, and it is surrounded and partially covered by a portion of the top plate, or an extension thereof, which contains the smoke-port K, the cold-air inlet Y, and the damper P.

The smoke-port is arranged at one end of the box, the cold-air inlet extends therefrom, as shown in Figs. 1 and 5, and the damper P is arranged to open or close the cold-air inlet, while it closes or opens the smoke-port, and the direct draft is thus checked by the cold air introduced into the flue-box through the inlet as well as by throttling the smoke-port.

It is necessary to so construct this portion of the range in order that the smoke-pipe or funnel may be attached to the collar surrounding the smoke-port, to lead directly upward therefrom, without interfering with the regular location of the six boiler-holes in relation to each other, and by it the draft may be regulated as desired, and the exact position of the damper at any time may be seen at a glance.

V V are the usual openings for clearing out the soot or the ashes from the flues, and Q is the register for admitting air beneath the fire.

R is a blank space inclosed for the purpose of contracting the flue beneath the oven E′.

It will be observed that it is absolutely necessary for a six-boiler range that the division-plate L separate the last hole, $B^1$, from the middle hole, $B^2$, on the same side. It is also necessary that the escape-port or smoke-pipe opening should be on the side of the division-plate shown and represented, in order that the products of combustion may be guided under all the boiler-holes.

It will be seen that the damper P not only operates to shut off the direct draft at the escape-port, but also operates to admit cold air into the flue, and that the area of the cold-air inlet increases in the same proportion as the area of the smoke-port decreases.

It will be further seen that by curving the division-plate L in the manner shown, and by extending the top plate as indicated, and by providing the range with the flue-box W, as shown, that a vertical collar or support for the smoke-pipe or funnel upon the top plate of the stove, surrounding the smoke-port, is provided, without interfering with the arrangement of the six holes.

The foregoing being a description of my improvements in cooking-stoves and ranges, I do not claim, broadly, the conducting of a fire-draft in such a manner as to heat two ovens, particularly when this purpose is effected by means of several divided flues, as shown in the patent of F. M. Baker, of December 4, 1866; but What I do claim, and desire to secure by Letters Patent, is—

1. The arrangement, relatively to the ovens E and E′, of the single flue F between the two ovens, the divided flue G, the single flues I and J, and the escape-port K, substantially as described, and for the purposes set forth.

2. The combination, with the above-claimed arrangement, of the flues of the deflecting-plate L and the valve N, substantially as set forth.

3. The damper P, when arranged to slide directly beneath the collar S, substantially as and for the purposes specified.

4. The combination, in a six-boiler range or stove, of a deflecting-plate, L, arranged between the stove-holes $B^1$ $B^2$, as shown, the flue-box W, and the escape-port K, opening upwardly from the said box, all arranged substantially as and for the purposes described.

5. In a six-boiler stove or range, a flue-box, W, arranged to project from the back thereof and to be surrounded and partially covered by the top plate, as shown, provided with the escape-port K, cold-air inlet Y, and damper P, all constructed substantially as set forth, and adapted to operate as described.

6. The combination, in a six-boiler range or stove, of a deflecting-plate, L, arranged between the boiler-holes $B^1$ $B^2$, as shown, the flue-box W, the escape-port K, the cold-air inlet Y, and the damper P, all arranged in relation to each other to operate substantially as and for the purposes specified.

JOSIAH M. READ.

Witnesses:
F. F. RAYMOND, 2d,
GEO. F. WALKER.